Sept. 7, 1954  A. S. GILL, JR  2,688,388
CLUTCH CONTROL
Filed April 2, 1952  3 Sheets-Sheet 1
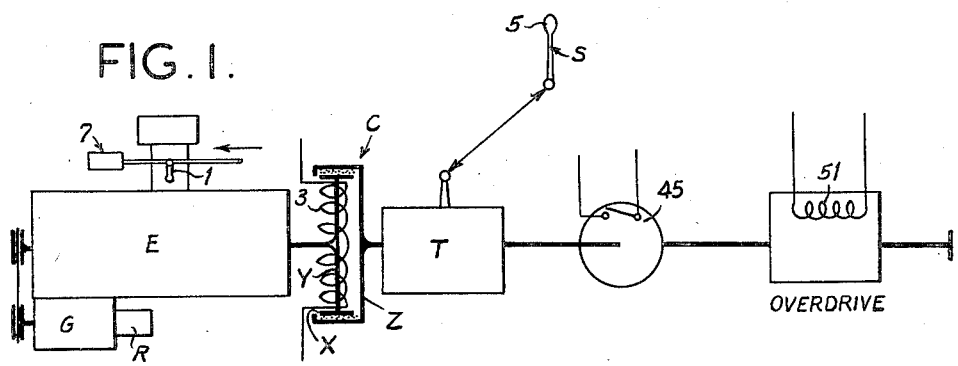
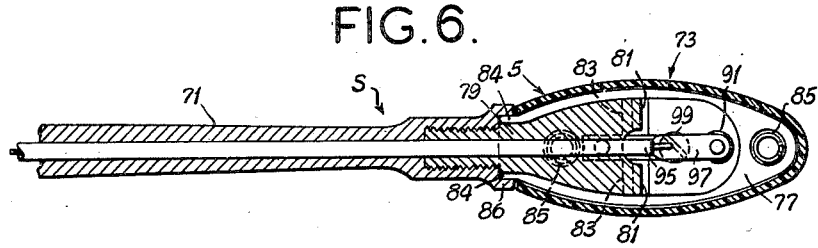
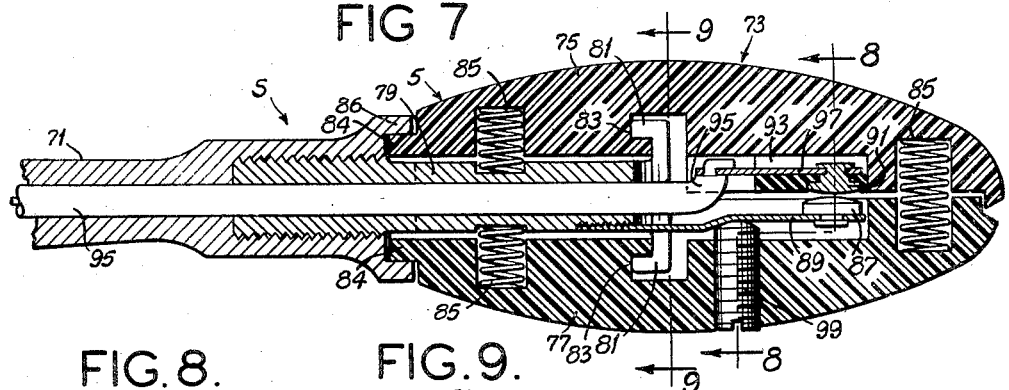
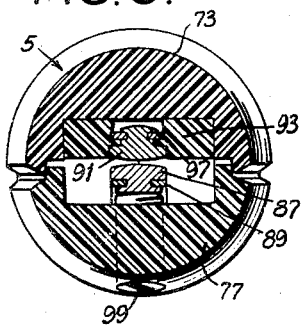 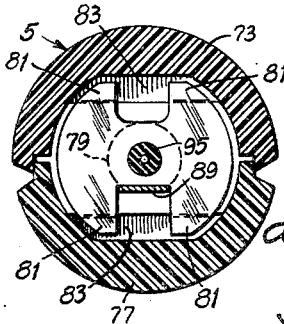
Andrew S. Gill, Jr.,
Inventor.
Koenig and Pope,
Attorneys.

Sept. 7, 1954　　　　　A. S. GILL, JR　　　　　2,688,388
CLUTCH CONTROL
Filed April 2, 1952　　　　　　　　　　　　　　3 Sheets-Sheet 2

Andrew S. Gill, Jr.,
Inventor.
Koenig and Pope
Attorneys.

Sept. 7, 1954   A. S. GILL, JR   2,688,388
CLUTCH CONTROL
Filed April 2, 1952   3 Sheets-Sheet 3

Andrew S. Gill, Jr.,
Inventor.
Koenig and Pope,
Attorneys

Patented Sept. 7, 1954

2,688,388

UNITED STATES PATENT OFFICE 2,688,388

CLUTCH CONTROL

Andrew S. Gill, Jr., Maple Heights, Ohio, assignor to Eaton Manufacturing Company, Cleveland, Ohio, a corporation of Ohio Application April 2, 1952, Serial No. 280,086

13 Claims. (Cl. 192—.052)

This invention relates to controls for automotive transmissions, and more particularly to clutch controls of the type disclosed by Martin P. Winther in United States Patent No. 2,539,649, issued January 30, 1951, entitled Clutch Control.

It is an object of the invention to provide for an inexpensive semi-automatic transmission particularly adapted for automobiles and the like. Many completely automatic transmissions are costly as compared to prior manual-clutch types, not only because they are complicated in themselves, but also because expensive tooling may be required for their manufacture. It is accordingly an object of the invention to provide for the semi-automatic operation of a transmission which will simplify driving procedure and avoid complete replacement of the elements heretofore used in manual systems.

Another object of the invention is the provision of a clutch control especially useful for control of electromagnetic clutches, the control being adapted to minimize clutch slip and thereby avoid excessive heating of the clutch during clutching operations.

Other objects include the provision of a semi-automatic control wherein clutching operations are automatically carried out preparatory to and after completion of each gear shift; the provision of a semi-automatic control wherein the driver retains manual control over the timing and sequence of gear shift events; the provision of a control particularly adapted to counteract the effects of residual magnetism resulting from the use of certain types of electromagnetic clutches; and the provision of a control which is inexpensive, trouble-free, and simple to operate.

In accomplishing these objects, the control is organized with certain conventional automotive elements including an engine having a throttle, a manually operated synchromesh transmission, a battery, a battery-charging generator and a regulator. In place of the usual manually operated clutch, an electromagnetic clutch is employed for coupling the engine with the transmission. This clutch is automatically controlled by a circuit of the type generally disclosed in the above patent, but which further includes a control switch responsive to manipulation of the manual shift lever. For example, the shift lever may incorporate pressure-sensitive switch mechanism adapted for actuation immediately prior to and upon completion of a gear shift. The switch mechanism is connected for automatically de-exciting the clutch to permit a gear shift.

The generator has its field coil initially connected for fixed excitation and its armature initially connected to excite the clutch through a current-modulating controller including switch means. The generator is driven by the engine and the controller is actuated by the engine throttle so that the exciting voltage applied to the coil is a function of both engine speed and throttle setting, these being the principal variables that determine the engine torque. In order to avoid undesired slip, the clutch excitation under varying acceleration is always sufficient to provide an instantaneous non-slip or breakaway clutch torque greater than the instantaneous engine torque. The arrangement, however, also provides for a variable rate of clutch modulation for varying driving conditions.

According to this invention, the generator is disconnected from the usual regulator under initial conditions of acceleration so that the generator may initially supply relatively large clutch excitation and provide for high clutch torque. After initial acceleration, speed-responsive switch means automatically connect the generator to the regulator for normal battery-charging operation. The speed-responsive switch means also provides for engine braking when the speed of the vehicle is above a predetermined value. In some embodiments of the control, there is further included switch means for automatically sending a pulse of demagnetizing current through the clutch coil preparatory to shifting, this being desirable in clutches of the magnetic fluid type. Other features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is a diagrammatic showing of certain conventional elements of an automobile and certain elements of the control of this invention;

Fig. 6 is a longitudinal horizontal section of a shift lever incorporating shift switch mechanism;

Fig. 7 is an enlarged longitudinal vertical section taken through the shift switch mechanism of Fig. 6;

Fig. 8 is a section taken on the line 8—8 of Fig. 7; and,

Fig. 9 is a section taken on the line 9—9 of Fig. 7.

Similar reference characters indicate corresponding parts throughout the several views of the drawings.

Figure 2:
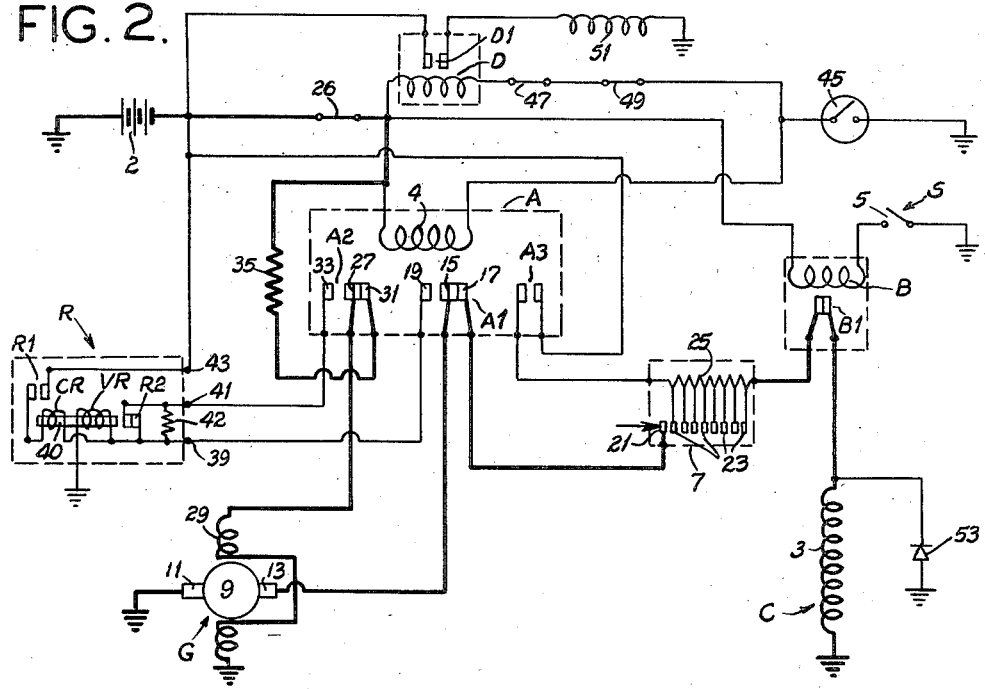
Fig. 2 is a circuit diagram of the control with initial circuit conditions for acceleration being shown in relatively heavy lines.

Referring to the drawings, Fig. 1 shows certain conventional elements of a typical automotive power plant, which includes an engine E having an accelerator or throttle 1. A conventional automotive type generator G is driven from the engine, and the generator is adapted to charge the usual storage battery 2 (Fig. 2) under control of a regulator R. Connected to the engine E is a clutch C coupled to a transmission T.

The transmission T may be a conventional synchromesh transmission adapted to provide various speed ratios upon manual manipulation of a shift lever S from a neutral position to various positions customarily designated first, second, third and reverse.

The clutch C is preferably an electromagnetic clutch of a type having inherent self-modulating characteristics and adapted for non-slip operation after modulated engagement. Clutches of this type are disclosed by H. J. Findley in U. S. Patent 2,519,449 and by Anthony Winther in U. S. Patents 2,580,869 and 2,543,394. Patents 2,519,449 and 2,543,394 show flowable magnetic material and 2,580,869 a magnetic lining for the purpose. The present invention is illustrated with a clutch of the type having flowable magnetic material therein. Thus clutch C is illustrated in Fig. 1 as including flowable magnetic material X interposed between a driving member Y and a driven member Z, one of which members carries a field coil 3. The inductance of the field coil 3 provides some current modulating effect, so that when voltage is applied thereto, the mass of magnetic material X is fairly rapidly but gradually magnetized. Modulated engagement of the clutch is thereby obtained by the gradual solidification of the magnetic material X. When engaged, the clutch is adapted to transmit torque without slip at values depending upon the excitation of the clutch. It will be understood that the magnetic lining type of clutch shown in Patent 2,580,869 also has a modulating engagement.

The control herein incorporates shift switch means 5 responsive to initiation and completion of a manual shifting operation to provide for opening of the clutch during actual shifting of the gears in the transmission T. Several types of switch mechanism may be useful for this purpose; for example, there may be switch mechanism located in the transmission for actuation by the gear movement or there may be switch mechanism responsive to the position of the shift lever; or there may be switch mechanism responsive to pressure applied to the lever in beginning and performing a shifting operation. A particular mechanism of the last type is disclosed hereinafter by way of example.

The control circuit, as shown in Fig. 2, includes a first circuit (heavy lines) for initially exciting the clutch during acceleration. The generator G is connected through normally-closed contacts of a transfer switch A1 of a relay A to a sequential-contact or "caterpillar" type of current-modulating controller 7. The circuit then continues from the controller 7 through a normally-closed switch B1 of a second relay B to the clutch field coil 3. In particular, the generator G has an armature 9, the positive brush 11 of which is grounded and the negative brush 13 of which is connected to a movable common contact 15 of the transfer switch A1. This movable contact 15 normally closes upon a back contact 17, but transfers to a front contact 19 upon energization of the coil 4 of relay A in order to establish an alternative circuit from the armature 9 to the regulator R.

The current controller 7 has a series of contacts 21 and 23 normally spaced from one another and adapted to be sequentially closed by movement of an actuator in the direction indicated. The actuator in turn is mechanically coupled to the engine throttle or accelerator 1 so that the controller 7 is actuated in the direction indicated when the throttle 1 is opened. At one end of the controller 7, there is the contact 21 which functions as a switch and is connected to the back contact 17 of the switch A1. The other contacts 23 are connected to a resistor 25 sequentially to short out increments of the resistor as the throttle is further opened. The resistor 25 is connected at its other end through the normally-closed switch B1 to one terminal of the field coil 3. The circuit is then completed through a ground connection as shown. The relay coil B is connected in a relay circuit including the shift switch 5, the battery 2 and an ignition switch 26, in order to open the switch B1 whenever the shift switch 5 is closed.

The relay A includes a second transfer switch A2 having a movable common contact 27, which normally closes upon a back contact 31 and is adapted to transfer to a front contact 33 when the relay coil A is energized. This movable contact 27 alternatively connects a field coil 29 of the generator G through the back contact 31 and through a resistor 35 to the battery 2 or through the front contact 33 to the regulator R.

Although such regulators may vary in detail, they generally include an armature terminal 39, a field terminal 41, a battery terminal 43 and a ground. In this control, the generator is initially disconnected from the regulator during acceleration and connected thereto under normal running conditions. The armature terminal 39 is accordingly connected to the front contact 19 of switch A1; the field coil terminal 41 is connected to the front contact 33 of switch A2; and the battery terminal 43 is connected direct to the battery 2.

Figure 3:
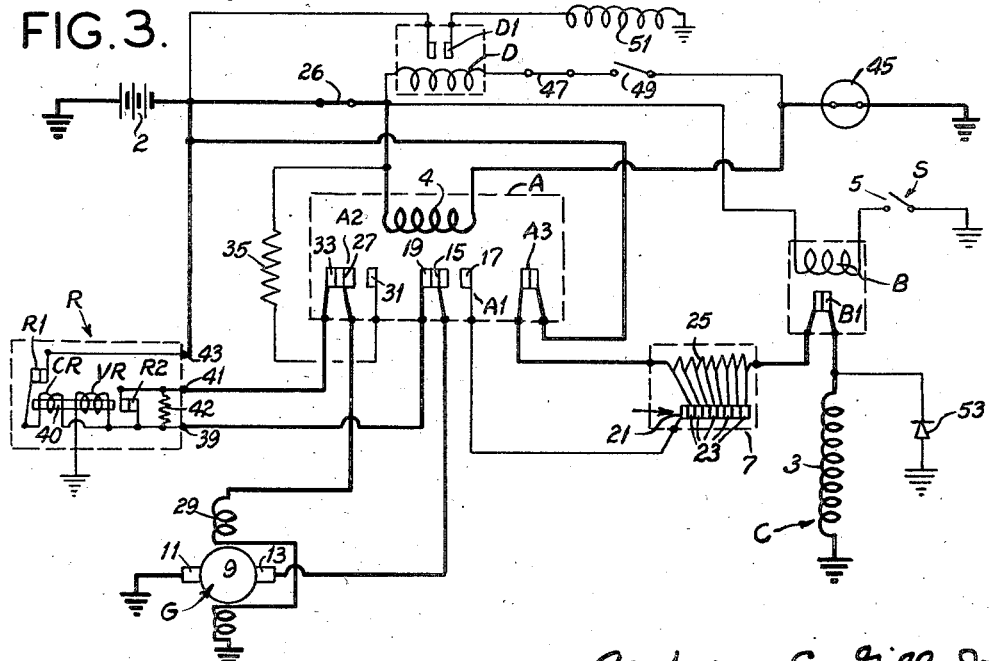
Fig. 3 is a circuit diagram like that of Fig. 2 with circuit conditions for normal driving conditions being shown in relatively heavy lines.

Figs. 2 and 3 show an exemplary current-voltage type of regulator having a voltage coil VR and a current coil CR. Both coils are wound upon a common core 40 and are connected to the armature terminal 39. The circuit for the voltage coil VR is completed through ground and the circuit for the current coil CR is completed to the battery terminal 43 through a normally-open cutout switch R1 located at one end of the core. A normally-closed regulating switch R2, located at the other end of the core, is connected across the armature and field terminals 39 and 41 to shunt a resistor 42 in the shunt field circuit of the generator.

In normal operation, it will be understood the cutout switch R1 is closed by VR when the generator voltage is sufficient to charge the battery and is opened by CR upon a reversal of current flow, as when the battery starts to discharge through the armature 9. The power output of the generator is limited at excessive engine speed by intermittent opening of the regulator switch R2 when the current flow through CR and/or the voltage across VR reach excessive values.

The relay A is responsive to a predetermined condition, which in the disclosed embodiment is a predetermined value of car speed. A relay circuit is provided from the battery through relay coil A and a governor switch 45 to ground. The governor switch is shown as driven from the output side of the transmission T and is responsive to the output speed thereof to close as this speed increases above a predetermined value and to reopen as the speed drops below this or a lower predetermined value. It will be understood that the purpose of relay A is to connect the generator for its normal function of charging the battery 2 after the generator has provided a relatively large controlled clutch excitation during initial acceleration of the car, and that the operation of the relay may be made to respond to conditions other than car speed if desired.

The coil 4 of relay A is also adapted to operate a normally-open switch A3. The switch A3 is connected in a circuit including the battery 2 and the resistor 25, but not the switch contact 21, of the controller 7. This circuit continues through the switch B1 to the clutch field coil 3. A rectifier valve element 53 is connected around the field coil 3 to permit inductive discharge from the field coil, thereby to protect the various switch contacts in the clutch exciting circuits.

In addition to the above, the control of Figs. 2 and 3 provides for automatic operation of a conventional overdrive. A relay coil D is connected in a relay circuit including the battery 2, a normally closed kick-down switch 47 for deactuating the overdrive, a lock-out switch 49, and the governor switch 45. Relay D operates a normally open switch D1 connected in a circuit including the battery 2 and an overdrive solenoid 51. When the governor switch 45 closes, the relay D is energized to close the associated switch D1, and thereby energizes the solenoid 51. The solenoid 51 in turn operates certain conventional mechanism to engage the usual planetary overdrive gear train (Fig. 1).

Operation is as follows:

The engine is started with the shift lever in neutral position and after the engine is running at its normal idling speed the gear shift lever S is manipulated to shift the transmission into first gear. Immediately prior to actual shifting of the gears, the shift switch 5 closes to energize the relay B and thereby open the switch B1 in the clutch circuit. Consequently the clutch is de-excited during the actual shifting of gears regardless of the position of the throttle 1 and the condition of the controller 7. With the clutch disengaged, the gears may be readily prepared for first gear operation. As the shifting operation is completed, the shift switch 5 opens, thereby deenergizing the relay B and permitting the switch B1 to close.

It is contemplated the driver will not ordinarily attempt to shift gears while racing the engine, hence initially the throttle will be substantially closed and the engine will be idling preparatory to accelerating from a stop. Under idling conditions the generator G will deliver a predetermined voltage preferably of a value such that the voltage applied to the clutch, with the contact 21 closed and the contacts 23 open, will correspond generally with the threshold excitation of the clutch. That is, the generator voltage should be just sufficient to engage the clutch for non-slip transmission of torque at low values corresponding to the minimum torque delivered by the engine with the throttle cracked. Consequently, when the throttle 1 is initially opened to close the contact 21, the clutch is engaged.

Initial modulating engagement of the clutch is provided by inherent reactance delay characteristics of the clutch coil, and the rate of modulation is determined by the exciting voltage initially applied to the clutch, it being understood that there is a predetermined threshold value below which the clutch cannot be engaged. If the throttle is opened a small amount the engagement is relatively slow because only a part of the generator voltage is applied to the clutch. If the throttle is suddenly opened wide, thereby shorting out the resistance 25, then the clutch engagement is relatively fast because the full generator voltage is applied to the clutch field coil. In this way, the control operates to provide a proper rate of modulation under conditions of both low and high acceleration.

As the torque output of the engine increases with increase in the engine speed, the clutch excitation and clutch torque also build up as a result of the increase in generator output. Preferably the control is adjusted as by selection of a suitable resistance at 35 and suitable resistance increments at 25, so that the clutch may always transmit greater torque than the engine torque, except perhaps at the very low engine speeds. Inasmuch as the clutch-exciting voltage is responsive to the engine speed and throttle setting, these preferred conditions can be obtained from this control.

It will thus be seen the rate of clutch engagement is controlled by the modulator 7, and both the generator G and the modulator 7 operate to provide proper but not excessive clutch excitation for varying values of engine torque.

Moreover, the control may initially supply clutch voltage in excess of the battery voltage, because the generator regulator R is disconnected and does not limit the generator voltage.

When the driver shifts into second gear, he habitually briefly releases pressure on the throttle or accelerator pedal, thereby gradually increasing the resistance at 25 gradually to decrease the clutch excitation. If the accelerator pedal is completely released, the circuit opens at the contact 21 completely to de-excite the field coil 3. Then as the actual shifting operation is beginning, the shift switch 5 closes and the switch B1 opens. This is desirable from the viewpoint of safety, inasmuch as some drivers may not completely release the accelerator pedal prior to making the shifting operation, in which event the switch B1 is effective to de-excite the field coil. In either event, the rectifier valve 53 bypasses the inductive discharge of the field coil 3 to prevent arcing at the contacts. With the shifting operation completed and the shift switch 5 reclosed upon release of the shift lever, the switch B1 recloses to prepare the clutch exciting circuit.

Modulated excitation is then obtained as before, but if the driver has not reduced the engine speed while making the shift to second gear so that greater generator voltage is applied to the field coil 3 when the switch B1 closes, the characteristics of the electromagnetic clutch still provide for some modulating effect, although the engagement will not be as slow as before. Slow engagement when shifting from first to second gear, however, is not so important, hence retraction of the throttle is not always essential to satisfactory operation under these conditions.

The shift to third gear is made in the same way as that to second and after a short interval the car is operating in a normal way. When the car speed reaches a predetermined value, for example from between 20 to 26 M. P. H., the governor switch 45 closes, thereby energizing the relay coil A. The normally open switch A3 then closes to establish a circuit from the battery 2 through the current modulator and normally closed switch B1 to the field coil 3 (see Fig. 3). The resistance 25 is partly bypassed by the contacts 23 some of which would ordinarily be closed. In any event, the resistance at 25 is low enough to permit a clutch excitation and torque sufficient for operation above the predetermined speed. At the same time when the relay A is energized, the common contacts 15 and 27 of the transfer switches A1 and A2 transfer from their back contacts 17 and 31, respectively, to the front contacts 19 and 33, respectively. This operation opens the clutch-exciting circuit at A1 from the generator armature 9 and connects the generator armature to the regulator R at 39. Also, the field coil 29 of the generator G is disconnected from the exciting circuit including the resistor 35, and connected at 41 to the regulator. Regulated battery charging action is then permitted.

It will be understood the clutch is not called upon to transmit high torque after initial acceleration, hence the relatively high clutch excitation is not always needed that may initially be obtained with the regulator R disconnected. In other words, with the gear ratio in the transmission reduced and the engine torque primarily limited by the speed of the engine, the maximum torque that may be applied to the clutch is considerably less than before. The generator voltage may consequently be limited to safe values for charging the battery, and the clutch excitation will be limited to a value preventing overheating of the clutch.

It should further be noted that engine braking action above the speed determined by switch 45 is obtained. Although the resistance at 25 is inserted into the clutch when the throttle is opened, this resistance is of a low value and the circuit is not opened, hence the clutch remains engaged to transmit braking torque in a reverse direction to the engine.

Overdrive action also occurs in the above embodiment when the governor switch 45 closes. Relay D is then excited to close the switch D1 and thereby energize the solenoid 51. This solenoid actuates suitable overdrive mechanism. If the overdrive is not desired, the lock-out switch 49 is opened. Also, the overdrive is disconnected, as during passing, by opening of kick-down switch 47 which is opened by substantially full deflection of the throttle pedal.

Figure 4:
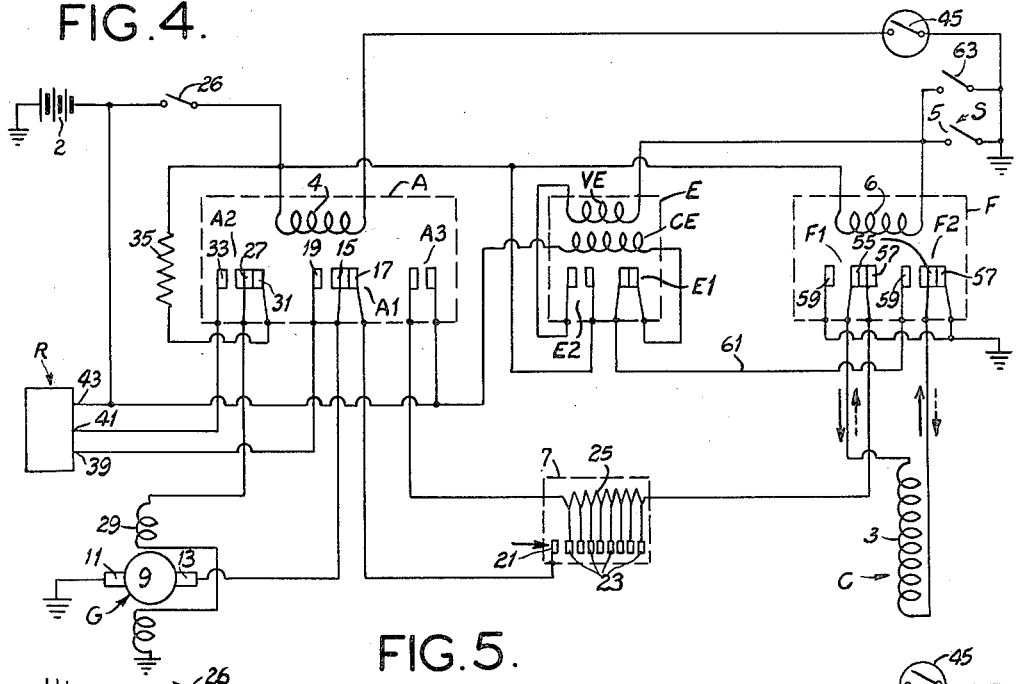
Fig. 4 is a circuit diagram of an alternative form of the control particularly adapted to counteract residual magnetism.
Figure 5:
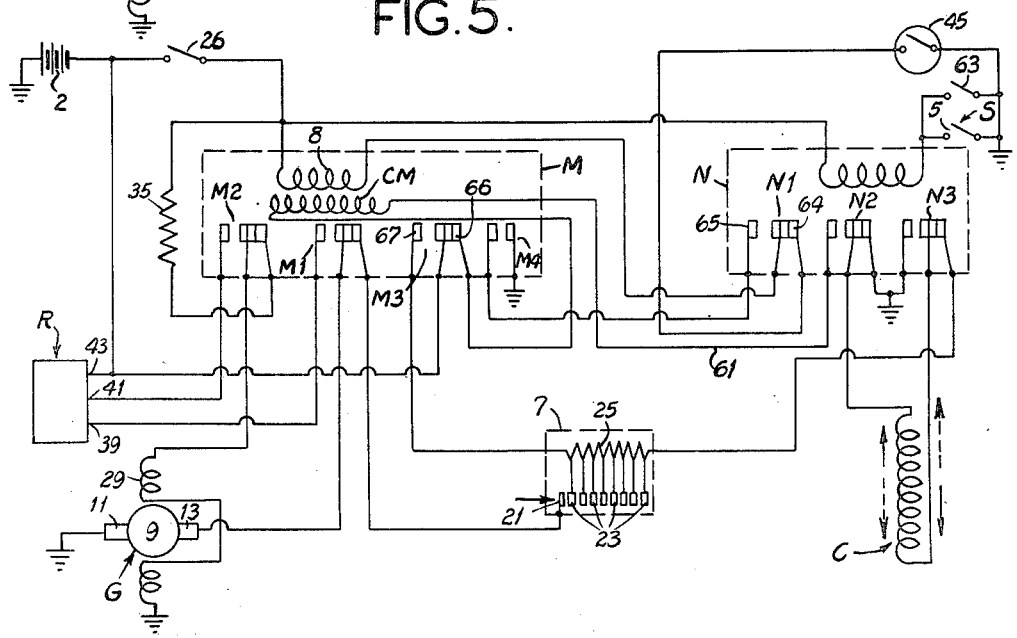
Fig. 5 is a circuit diagram of an additional form of the invention particularly adapted to counteract residual magnetism.

Referring to Figs. 4 and 5, there is shown an embodiment of the control particularly adapted for use with electromagnetic clutches of the type having considerable residual magnetism. Some types of magnetic clutches do not readily release upon de-excitation, and the controls of both Fig. 4 and Fig. 5 are adapted to demagnetize such clutches by means of a reverse pulse of current passed through the field coil 3.

Both embodiments are similar to the Fig. 2 embodiment, hence like reference characters are used where appropriate. The circuit of Fig. 4 includes the current-modulating controller 7, the generator G, the relay A, the regulator R, the battery 2 and the shift switch 5, all connected as described above. The clutch field coil 3 is adapted to be connected to the controller 7 through a pair of transfer switches F1 and F2 of a relay F. The switches F1 and F2 have movable common contacts 55 normally closing upon back contacts 57 to provide a circuit from the controller 7 through the clutch coil 3 to ground as shown. When the relay coil 6 is energized, the common contacts 55 transfer to front contacts 59 and reverse the ground connection for the coil and connect the coil 3 for excitation from a conductor 61.

The conductor 61 is connected to the battery 2 through a normally-closed switch E1 and a current coil CE of a relay E. The relay E also includes a voltage coil VE and a normally-open switch E2 connected in series between the battery and the shift switch 5. Connected in parallel with the shift switch 5 is a neutral switch 63 adapted to be closed when the shift lever S is in a neutral position and to otherwise open. Switches responsive to the position of a shift lever are known in the art, hence switch 63 is not described in detail.

Operation of the control is as described heretofore, with the following exceptions:

With the shift lever S in neutral position, the neutral switch 63 is closed, and when the engine is started by closure of the ignition switch 26, the relay F is energized to operate switches F1 and F2 and establish a circuit from the clutch to the conductor 61.

Current supplied by the battery then flows through the clutch in a direction indicated by the dotted arrows to demagnetize the clutch. This current flow, however, also is through the current coil CE and switch E1, so that relay E is actuated. Switch E1 opens to disconnect the conductor 61, and switch E2 closes, the latter maintaining the relay E actuated. As a result, only a short pulse of current flows through the clutch winding 3, and while the pulse is sufficient to demagnetize the clutch, it is not sufficient to engage the clutch.

As the shift lever is moved out of neutral position, the shift switch 5 closes so that opening of the neutral switch 63 does not change the circuit. When the shift has been completed, the shift switch 5 opens, the relays E and F are deenergized and the clutch is prepared for normal excitation through the current modulator 7 in a direction indicated by the solid arrows. When a new shifting operation is begun, the shift switch 5 recloses and operates the relays E and F as described above to demagnetize the clutch.

The control circuit shown in Fig. 5 is similar to that of Fig. 4, but includes fewer relays. In this instance, there is a relay M having switches M1 and M2 which correspond with the switches A1 and A2 described in connection with Fig. 4. The current modulator 7, the generator G, the regulator R, the battery 2, and the switches S, 26, 45 and 63 are as described above. The relay coil 8 has the functions of relay coils 4 and VE, and is connected to the speed-responsive switch 45 through a back contact 64 of a transfer switch N1 of a relay N. A front contact 65 of the switch N1 is connected to ground through a normally-open switch M4 of the relay M. The relay N also has transfer switches N3 and N2 corresponding to the transfer switches F1 and F2, respectively, of Fig. 4. The conductor 61 is connected to the battery 2 through a current coil CM in the relay M and then to a back contact 66 a transfer switch M3, which corresponds to switch E1. A front contact 67 of switch M3 corresponds with switch A3.

The operation is similar to that described for the embodiment of Fig. 4. Whenever the neutral switch 63 of the shift switch 5 is closed, the relay N is energized so that switches N2 and N3 prepare the clutch circuit for reverse excitation from the conductor 61, and so that switch N1 connects coil 8 in series with switch M4. A demagnetizing pulse of current is then supplied to the conductor 61 from the battery 2 through the front contact 65 of the actuated transfer switch N1 and through the coil CM. The demagnetizing current energizes the coil CM to open the switch M3 at contact 66 and to close the switch M4 to establish a holding circuit through the coil 8. From the above, it will be apparent that the coils 8 and CM correspond with the coils VE and CE of Fig. 4 during the demagnetizing sequence.

Referring to Figs. 6–9, a satisfactory type of shift switch mechanism 5 is shown to comprise a hollow shift lever 71 adapted to extend from the steering column in the usual manner. A split knob 73 formed from upper and lower shells 75 and 77, respectively, is fastened to the end of the lever 73. The shells 75 and 77 are retained by a hollow core member 79 threaded at one end into the end of the lever 73 and having reentrant fingers 81 at its other end. The reentrant fingers are loosely received within dovetails 83 so formed in the shells 75 and 77 as to limit outward movement of the shells but permit their inward movement against the bias of coil springs 85. Lips 84 are also loosely received under a flange 86 on the lever.

A switch contact 87 is supported to face upwardly upon a spring strip 89 welded to and grounded through the inner end of the core member 79. A cooperating contact 91 is supported in normally spaced relation from the contact 87 by means of a holder 93 fitted into a suitable recess in the upper shell 75. The contact 91 is electrically connected to a wire 95 by means of a conductive strip 97. Movement of the lower shell 77 is transmitted to the lower contact 87 by means of a stud 99 adjustably threaded through the lower shell to abut with the underneath side of spring strip 89. Adjustment is made at 99 so that pressure applied to either the upper or lower shell member results in closure of the contacts 87 and 91 to establish a circuit from the conductor 95 to ground. It will be understood that other types of shift switch mechanism may be employed and that the disclosure of Figs. 6–9 is merely illustrative.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A control for an electromagnetic clutch driven by a variable-speed engine which drives a generator, the generator having an armature and a field coil and being adapted for charging a battery under control of a regulator, said clutch driving an output shaft; the control comprising first, second and third switch means each adapted for actuation from a first position to a second position, means responsive to a predetermined speed of said output shaft for actuating said three switch means, said first switch means being connected to establish alternative circuits from the armature to the clutch and to the regulator when in its first and second positions respectively, the second switch means being connected to establish alternative circuits from the field coil of the generator to the battery and to the regulator when in its first and second positions respectively, and the third switch means being connected to establish a circuit from the battery to the clutch in its second position only.

2. A control as set forth in claim 1 wherein said first, second and third switch means are incorporated in a relay having a relay coil for actuating said switch means, a relay circuit connected to said relay coil to energize it, and a normally-open speed-responsive switch connected in said relay circuit.

3. A control as set forth in claim 1 further including a current-modulating controller connected between said first switch means and said clutch, a speed control for said variable-speed engine, and means mechanically coupling said speed control to said current-modulating controller.

4. A control as set forth in claim 3 wherein said current-modulating controller is a variable resistance, a fixed portion of the resistance thereof being connected between said third switch means and said clutch.

5. Clutch control apparatus for an electromagnetic clutch the breakaway torque of which is a certain function of its excitation, said clutch being adapted for use with an engine the developed torque of which is a certain function of its speed and accelerator movement; said control apparatus comprising a generator having an armature and a field, said armature being driven by the engine and said field connected to means providing a predetermined fixed field excitation, a clutch exciting circuit connecting the generator armature to excite the clutch with varying voltage corresponding to the speed of the engine, and a variable-impedance current-modulating controller actuated by the accelerator and connected in said clutch exciting circuit to vary the clutch excitation in response to accelerator movement, the speed-to-voltage characteristic of said generator as determined by its predetermined field excitation being such and the impedance-to-accelerator-position characteristic of said controller being such that the breakaway torque of the clutch corresponds approximately with the developed torque of the engine throughout a substantial range of engine speeds and accelerator settings.

6. Clutch control apparatus for automotive use, which includes a variable-speed engine adapted to be controlled by an accelerator, a gear transmission having a shift member, and an electromagnetic clutch for coupling the engine to the transmission; said clutch control apparatus comprising a clutch-energizing circuit including means for energizing the clutch in response to movement of said accelerator, and a pressure-sensitive switch mechanism responsive to manipulation of said shift member and adapted for actuation when pressure is applied to the member prior to shifting movement of the transmission gears and adapted for deactuation when pressure is removed from the shift member upon completion of a shift, whereby the clutch is de-excited and re-excited immediately prior to and upon completion of a shifting operation.

7. Control apparatus as set forth in claim 6 further including neutral switch means connected to open the clutch circuit when the transmission is in neutral.

8. Clutch control apparatus for an automobile which includes an engine controlled by an accelerator, a generator driven by the engine, a battery adapted to be charged by the generator, a transmission having a manual shift lever, an electromagnetic clutch for coupling the engine to the transmission, said generator having an armature and a field coil; said control apparatus comprising a first clutch-exciting circuit connecting said armature with said clutch, said first exciting circuit including a current-modulating controller adapted to be actuated by said accelerator, and a pressure-sensitive switch mechanism responsive to manipulation of said shift member and adapted for actuation when pressure is applied to the member prior to shifting movement of the gears and adapted for deactuation when pressure is removed from the shift member upon completion of a shift, whereby said clutch is de-excited and re-excited immediately prior to and upon completion of a shifting operation.

9. Clutch control apparatus for an automobile which includes an engine controlled by an accelerator, a generator driven by the engine, a regulator, a battery adapted to be charged by the generator under control of said regulator, a transmission having a manual shift lever, an electromagnetic clutch for coupling the engine to the transmission, said clutch having an output shaft, said generator having an armature and a field coil; said control apparatus comprising a first clutch-exciting circuit connecting said armature with said clutch, said first exciting circuit including a variable-resistance current-modulating controller adapted to be actuated by said accelerator and shift switch means, said switch means adapted for actuation by said manual shift lever to open and to close said clutch circuit immediately prior to and upon completion of a shifting operation, first, second and third switch means each adapted for actuation from a first position to a second position, means responsive to a predetermined speed of said output shaft for actuating said first, second and third switch means, said first switch means being connected to close said clutch-exciting circuit in its first position and to connect the armature to the regulator in its second position, the second switch means being connected to establish alternative circuits from the field coil to the battery and to the regulator in its first and second positions respectively, and said third switch means being connected to establish a circuit from the battery to said clutch through a fixed portion of the controller resistance in its second position only.

10. Clutch control apparatus for an automobile which includes an engine controlled by an accelerator, a generator driven by the engine, a regulator, a battery adapted to be charged by the generator under control of said regulator, a transmission having a manual shift lever, an electromagnetic clutch for coupling the engine to the transmission, said clutch having an output shaft said generator having an armature and a field coil; said control apparatus comprising a first clutch-exciting circuit connecting said armature with said clutch, said first exciting circuit including a variable resistance current-modulating controller adapted to be actuated by said accelerator and shift switch means adapted for actuation by said manual shift lever to open and to close said clutch circuit immediately prior to and upon completion of a shifting operation, first, second, and third switch means each adapted for actuation from a first position to a second position, means responsive to a predetermined speed of said output shaft for actuating said first, second and third switch means, said first switch means being connected to close said clutch-exciting circuit in its first position and to connect the armature to the regulator in its second position, the second switch means being connected to establish alternative circuits from the field coil to the battery and to the regulator in its first and second positions respectively, said third switch means being connected to establish a circuit from the battery to said clutch through a fixed portion of the controller resistance in its second position only, and transfer switch means connected to excite the clutch from the controller and from the battery in a reverse direction, said transfer switch means being responsive to the shift switch means, and current responsive means connected to interrupt the reverse excitation current in response to a predetermined flow thereof sufficient to demagnetize the clutch and insufficient to engage the clutch.

11. Control apparatus as set forth in claim 10 further including a neutral switch responsive to manipulation of the shift lever and connected in parallel with said shift switch means.

12. Clutch control apparatus for an automobile and the like which includes an engine, a transmission and an electromagnetic clutch for coupling the engine to the transmission, the clutch being of a type having considerable residual magnetism which interferes with disengagement of the clutch; said control apparatus comprising exciting means for exciting the clutch, transfer switch means connected to establish alternative first and second circuits from the exciting means to excite said coupling in opposite directions, means responsive to shifting of said transmission for actuating the transfer switch means to disconnect the first circuit and establish the second circuit at the beginning of a shifting operation and to disconnect the second circuit and reconnect the first circuit at the completion of a shifting operation, and current-responsive switch means connected to interrupt the second circuit in response to flow of a predetermined current sufficient to demagnetize the clutch and insufficient to engage the clutch.

13. Clutch control apparatus as set forth in claim 12 wherein the current-responsive means comprises a first relay coil and a normally-closed first switch actuated thereby, both of which are connected in series, a normally-open second switch actuated by said first coil, and a second relay coil, said second coil being series connected through said second switch to supply means by a relay circuit.

References Cited in the file of this patent

UNITED STATES PATENTS

| Number | Name | Date |
|---|---|---|
| 1,946,200 | Easter | Feb. 6, 1934 |
| 2,175,219 | Sanford | Oct. 10, 1939 |
| 2,539,649 | Winther | Jan. 30, 1951 |